(12) United States Patent
Sharma et al.

(10) Patent No.: US 7,200,790 B2
(45) Date of Patent: Apr. 3, 2007

(54) SWITCH LEVEL RELIABLE TRANSMISSION

(75) Inventors: Anup K. Sharma, Sunnyvale, CA (US); Michael K. Wong, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 383 days.

(21) Appl. No.: 10/616,269

(22) Filed: Jul. 8, 2003

(65) Prior Publication Data

US 2005/0021823 A1    Jan. 27, 2005

(51) Int. Cl.
*H04L 1/18* (2006.01)
(52) U.S. Cl. ..................... 714/749; 714/758
(58) Field of Classification Search ............... 714/751, 714/749, 758
See application file for complete search history.

(56) References Cited

U.S. PATENT DOCUMENTS

| | | | | |
|---|---|---|---|---|
| 4,346,474 A | * | 8/1982 | Sze | 714/802 |
| 4,785,393 A | * | 11/1988 | Chu et al. | 712/221 |
| 5,844,918 A | * | 12/1998 | Kato | 714/751 |
| 6,263,374 B1 | | 7/2001 | Olnowich et al. | |
| 6,414,956 B1 | * | 7/2002 | Szczepanek | 370/392 |

FOREIGN PATENT DOCUMENTS

JP       07321809       12/1995

* cited by examiner

Primary Examiner—Albert Decady
Assistant Examiner—Mujtaba K. Chaudry
(74) Attorney, Agent, or Firm—Martine Penilla & Gencarella, LLP (57) ABSTRACT

A microchip configured to reliably transmit data is provided. The microchip includes a memory region and a selection module configured to select a portion of the data from the memory region. An error checking module configured to calculate a value derived from the selected portion of the data is provided. A pointer region including a plurality of object pointers is included. One of the object pointers is associated with an address of the portion of the data. The object pointer associated with the address is configured to receive a signal indicating an error associated with the transmission of the data. A scheduler module in communication with each of the plurality of object pointers is provided. The scheduler module is configured to schedule re-transmission of the selected portion of the data. A system and a method for reliably transmitting data between microchips are also provided.

16 Claims, 6 Drawing Sheets

SWITCH LEVEL RELIABLE TRANSMISSION

BACKGROUND OF THE INVENTION

1. Field of the Invention

The present invention relates generally to microprocessors, and more specifically to a method and apparatus for the reliable transmission of data between microprocessors.

2. Description of the Related Art

In a multi-processor environment, it is important to transmit data between processors. Additionally, the transmission of data in the multi-processor environment requires the ability to re-transmit the data in the case of a detected error. Providing this reliability tends to increase the overhead associated with the current configurations for reliably transmitting data between microchips. In addition, the continuing quest to more efficiently use the chip real estate has demanded that an increasing amount of features be included on the die area in order to enable more functionality.

Figure 1:
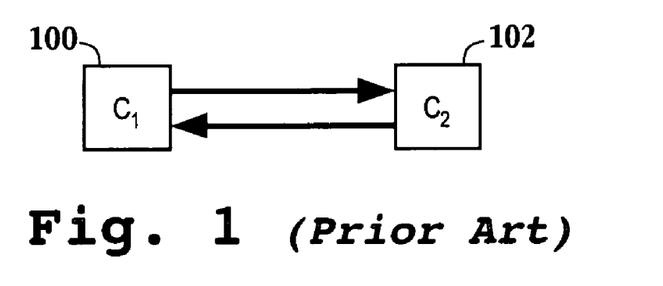
FIG. 1 is a simplified schematic of two microprocessors in communication with each other over a high speed link.

FIG. 1 is a simplified schematic of two microprocessors in communication with each other over a high speed link. Chip 1 100 is a front end interface chip while chip 2 102 is a switch that supports a large number of ports in order to interface with a number of chips. One scheme for ensuring the reliable transmission of data is the use of a cyclic redundancy check (CRC). When a CRC result does not match for the receiving and transmitting devices, then an error signal to re-transmit the data is executed. A conventional configuration of chip 2 102 to provide reliable communication, includes a main memory of chip 2, which is associated with retry buffers that are configured to store packet data to be re-transmitted in the case of an error. The retry buffers are the same width as the main memory. When a particular packet is originally sent from the main memory, the packet is stored in the retry buffer until there is an indication that the transmitted packet was received correctly.

One of the shortcomings of this configuration is that the chip real estate consumed by the retry buffers is quite large. For example, where the main memory is 128 bytes wide, which corresponds to a packet size width, in turn, results in the retry buffers being 128 bytes wide. Therefore, each retry buffer has enough memory space for 8 packets or 1024 bytes. If there are 128 retry buffers on the chip, it should be appreciated that a significant portion of the area is devoted to the retry buffer space. Additionally, the area devoted to the retry buffers is exclusively used for retry buffer activity. As only a sub-set of the retry buffers may be used for storage of transmitted data, any unused retry buffer space can not be allocated for other memory purposes. Moreover, the decode logic associated with the retry buffers further limits the area available for main memory. Furthermore, the overhead associated with the retry buffers is excessive.

In light of the foregoing, it is desired to implement a scheme to reliably provide for the transmission of data between microprocessors in a manner that enables more efficient use of the chip area.

SUMMARY OF THE INVENTION

Broadly speaking, the present invention fills these needs by providing a reliable transmission scheme which integrates the retry buffers into the main memory, thereby resulting in reduced overhead. The present invention can be implemented in numerous ways, including as a process, an apparatus, a system, a device, or a method. Several embodiments of the present invention are described below.

In one embodiment, a method for reliably transmitting data between microprocessors is provided. The method initiates with selecting a data packet stored in memory. The memory is associated with a first microprocessor and the data packet is to be transmitted from a first microprocessor to a second microprocessor. Then, a pointer region configured to indicate an address of the data packet in the memory is established. Next, a first value derived from the data packet is appended to the data packet. Then, the data packet is transmitted to a second microprocessor. Next, the first value is compared to a second value derived from the data packet which is received by the second microprocessor. Then, if the second value is different than the first value, the method includes transmitting a signal to the pointer region for retransmission of the data packet and re-transmitting the data packet from the memory.

In another embodiment, a microchip configured to reliably transmit data is provided. The microchip includes a memory region for storing data and a selection module configured to select a portion of the data from the memory region for transmission. An error checking module configured to calculate a value derived from the selected portion of the data prior to transmission of the selected portion is provided. A pointer region including a plurality of object pointers is included. One of the object pointers is associated with an address of the portion of the data. The object pointer associated with the address is configured to receive a signal indicating an error associated with the transmission of the selected portion of the data. A scheduler module in communication with each of the plurality of object pointers is provided. The scheduler module is configured to schedule re-transmission of the selected portion of the data from the memory in response to the signal indicating the error being received by the object pointer.

In yet another embodiment, a system providing reliable link data flow between microchips is provided. The system includes a first microchip having a memory capable of storing a data packet. The first microchip further includes a pointer associated with a memory address of the data packet and a selection logic module in communication with the memory. The selection logic module is configured to select the data packet for transmission from the memory. The first microchip includes an error checking module configured to calculate a first value derived from the data packet prior to transmission of the data packet from the first microchip and a serial link. The system includes a second microchip in communication with the first microchip through the serial link. The second microchip includes an error verifying module configured to calculate a second value derived from the data packet received from the first microchip. The error verifying module is further configured to compare the second value to the first value. If the first value and the second value are different the error verifying module transmits a signal to the pointer causing the data packet to be re-transmitted to the second microchip from the memory of the first microchip.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention is described for a device and method for reliably transmitting data between microprocessors with minimal overhead. It will be obvious, however, to one skilled in the art, that the present invention may be practiced without some or all of these specific details. In other instances, well known process operations have not been described in detail in order not to unnecessarily obscure the present invention.

The embodiments of the present invention provide a device and method for the reliable transmission of data between microchips. A scheme for protecting the output from one memory to the input of another memory. The protection scheme employs two mechanisms. One of the mechanisms is a cyclic redundancy check and the other mechanism is a parity check. Both mechanisms protect the data transmission from soft errors. In addition, the retry buffers have been integrated into the memory, and replaced by retry pointers configured to point to an address in the memory. Accordingly, the layout of the chip is more efficient and the overhead associated with the decode logic of the retry buffers is substantially eliminated. One skilled in the art will appreciate that the embodiments described herein are applicable to any system where multiple chips communicate through a switch and it is desirable to provide reliable transmission of data between microchips and reduce the overhead associated with a transmission protection scheme.

Figure 2:
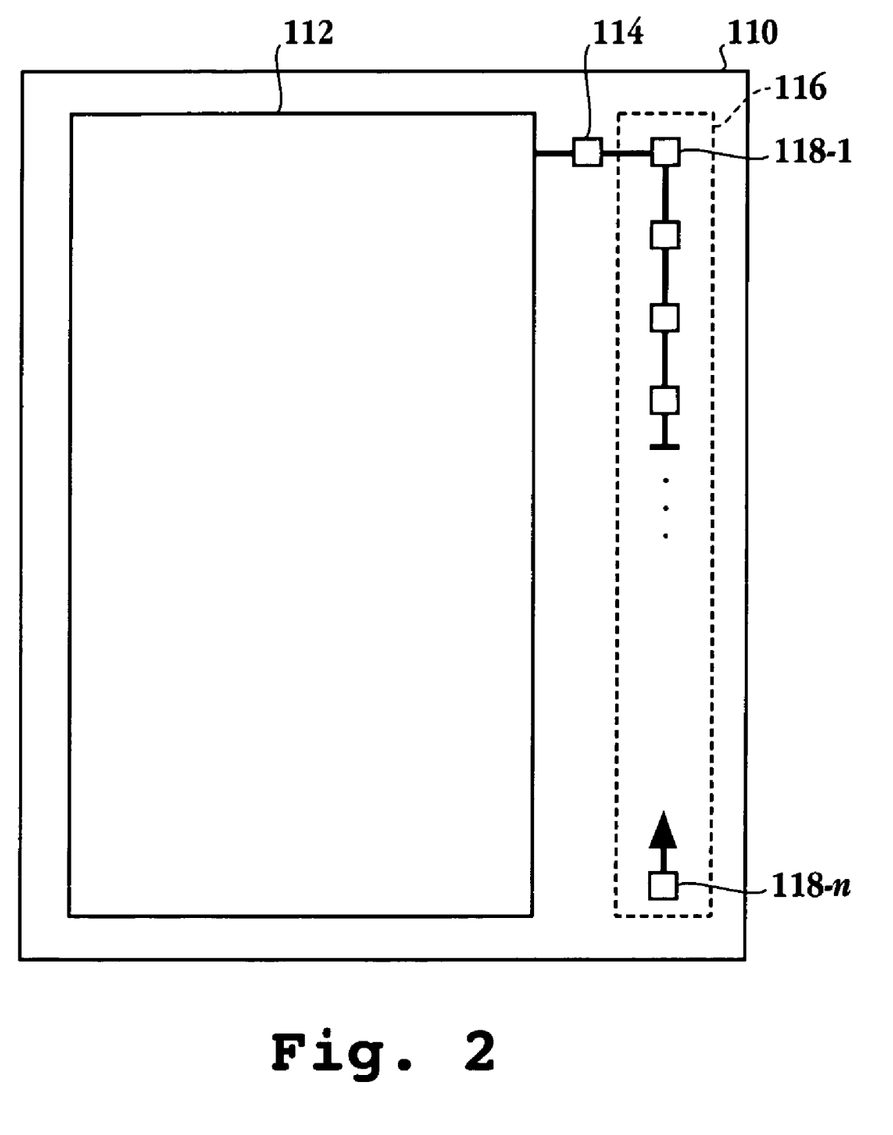
FIG. 2 is a simplified schematic diagram of a memory being associated with a plurality of retry pointers in order to provide reliable link data flow with minimal overhead in accordance with one embodiment of the invention.

FIG. 2 is a simplified schematic diagram of a memory being associated with a plurality of retry pointers in order to provide reliable link data flow with minimal overhead in accordance with one embodiment of the invention. Microchip 110 includes memory region 112. Memory region 112 is in communication with scheduler 114. Scheduler 114 is in communication with retry pointers 118-1 through 118-n of pointer region 116. As will be described further below, pointer region 116 includes a plurality of retry pointers 118-1 through 118-n, where each of the retry pointers are capable of holding an 11-bit address. Thus, rather than having a plurality of retry buffers and the associated decode logic, the retry buffers have been integrated into memory 112 and address pointers, i.e., retry pointers now direct retry signals to the appropriate location in memory 112. In one embodiment, microchip 110 includes 2048 retry pointers where each retry pointer is configured to hold and 11 bit address, which corresponds to a memory size of $2^{11}$. One skilled in the art will appreciate that the overhead associated with 2048 retry pointers is still less as compared to the overhead associated with 128—8 byte retry buffers and corresponding decode logic.

Figure 3:
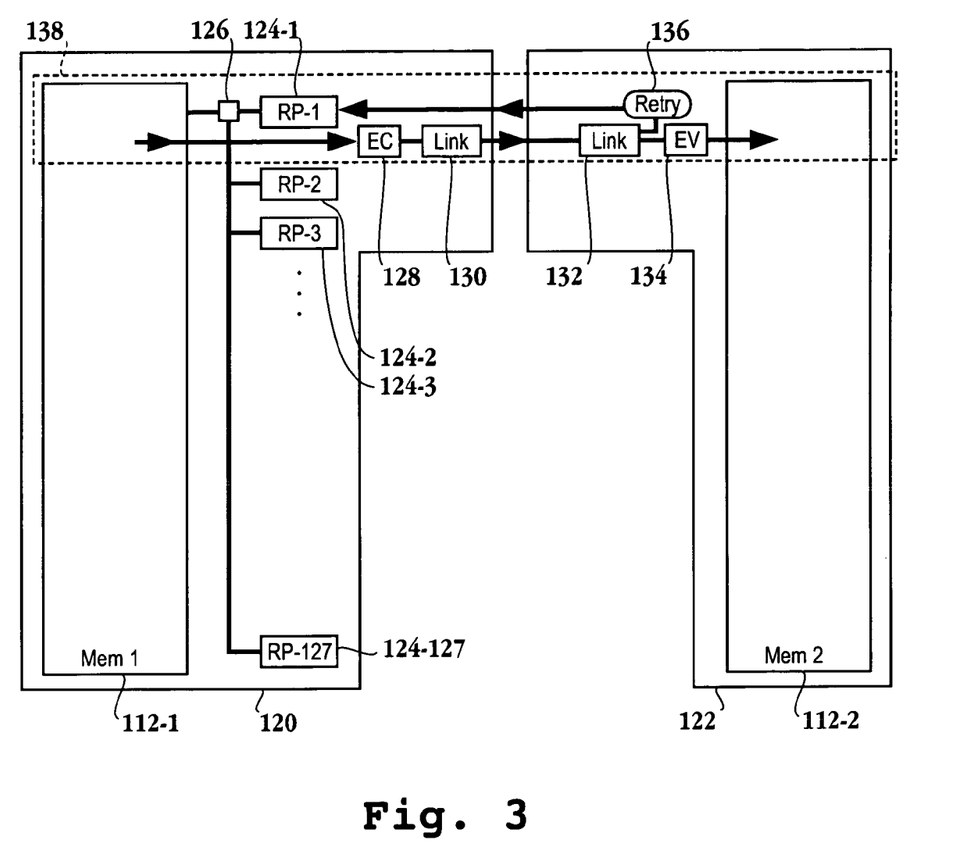
FIG. 3 is a simplified schematic diagram illustrating a scheme for reliably communicating data between each of the two chips in accordance with one embodiment of the invention.

FIG. 3 is a simplified schematic diagram illustrating a scheme for reliably communicating data between each of the two chips in accordance with one embodiment of the invention. Chip 120 includes memory 1 112-1, scheduler 126, retry pointers (RP) 124-1 through 124–127, error check (EC) module 128 and serial link 130. Chip 2 includes memory 2 112-2 serial link 132, error verification (EV) module 134 capable of generating retry signal 136. Here, data stored in main memory 112-1 is accessed through selection logic. Error checking module 128 performs error checking functionality and calculations, e.g., cyclic redundancy check (CRC), and parity check calculations. The data is then transmitted through serial link 132. The received data is then analyzed through error verification module 134, where it is determined whether the received data is associated with any errors. If there is no error, then a retry signal is generated and communicated to the appropriate retry pointer in order to re-transmit the data.

Figure 4:
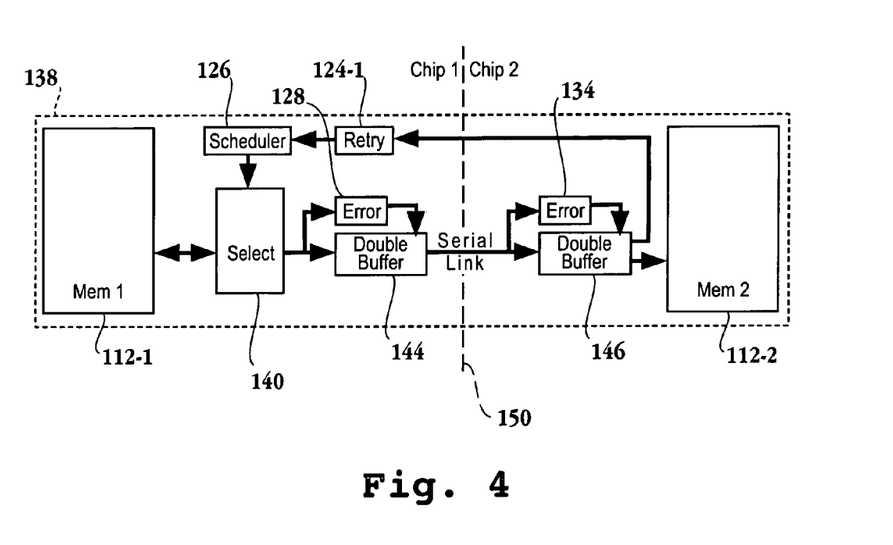
FIG. 4 is a simplified schematic diagram providing a more detailed description of components associated with the reliable transmission of data described with reference to FIG. 3.

FIG. 4 is a simplified schematic diagram providing a more detailed description of components associated with the reliable transmission of data described with reference to FIG. 3. Here, region 138 of FIG. 3 is shown in more detail in FIG. 4. Memory region 1 112-1 is in communication with selection module 140 which selects data to be transmitted to chip 2. Line 150 represents a dividing line separating chip 1 from chip 2. The data from selection module 140 is communicated to double buffer 144 and is then transmitted through a serial link to chip 2. Simultaneous to the transmission to double buffer 144 the data is processed through error module 128 in order to determine if the data is valid. In one embodiment, a parity check is performed through error module 128. The data transmitted through the serial link to chip 2 is received by double buffer 146. At the same time, the received data is checked for errors by error module 134. If an error is detected by error module 134 then a retry signal is forwarded to retry pointer 124-1. Retry pointer 124-1 holds an 11 bit address in accordance with one embodiment of the invention. The 11 bit address points to a region in memory 1 112-1 where the data for re-transmission resides. Retry pointer 124-1 is in communication with scheduler module 126. Scheduler module 126 is configured to override selection module 128 where an error has been detected and retransmission has been requested. That is, in response to retry pointer 124-1 receiving a retry signal, scheduler module 126 will override selection module 128 in order to access the appropriate data in memory 1 112-1 for re-transmission.

Figure 5:
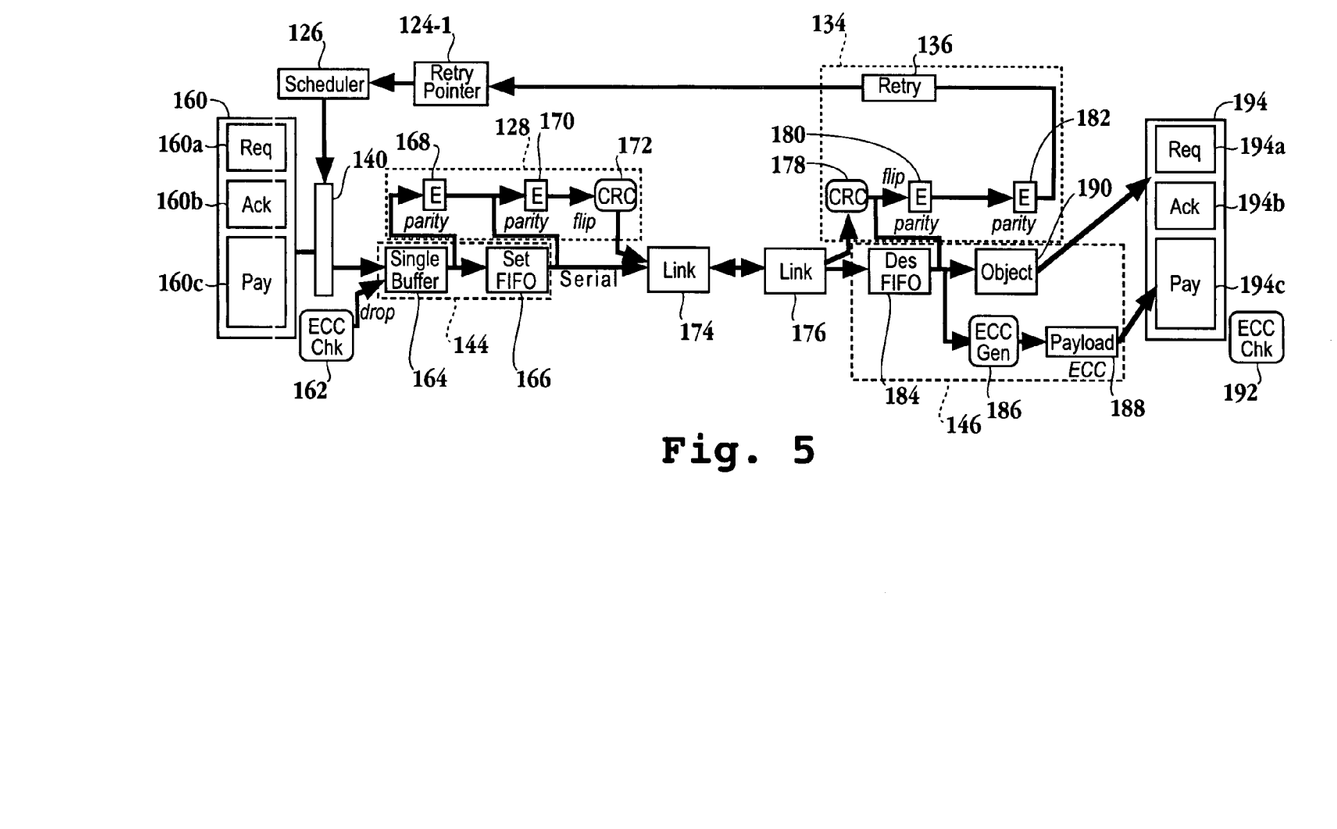
FIG. 5 is a schematic diagram of the modules associated with a reliable link data flow in accordance with one embodiment of the invention.

FIG. 5 is a schematic diagram of the modules associated with a reliable link data flow in accordance with one embodiment of the invention. Data packet 160 which includes request segment 160a acknowledge segment 160b and payload segment 160c is selected by selection module 140 from memory for transmission. It should be appreciated that selection module 140 includes selection logic for selecting the data packet. Data packet 160 is sent to single buffer 164. One skilled in the art will appreciate that segments 160a through 160c of data packet 160 may include error correction code (ECC) bits, where ECC check module 162 may verify that the data is correct in addition to computing a parity bit for the data. The error checked data will then pass through single buffer 164 to serializer first in, first out (FIFO) buffer 166. Parity bit 168 is checked for the output of single buffer 164. Similarly, parity bit 170 is also checked at the output of serializer FIFO 166. Based on the output data from serializer FIFO 166 a cyclic redundancy check (CRC) is computed through module 172. In one embodiment, if either of the parity checks of modules 168 and 170 find an error, then the CRC calculated through CRC module 172 is intentionally corrupted. Accordingly, all downstream components will be able to determine that there is an error associated with data when checking the CRC at downstream checkpoints. It will be apparent to one skilled in the art, that single buffer 164 and serializer FIFO 166 may be integrated into a double buffer.

Still referring to FIG. 5, the data packet is then transmitted through serial link 174 which is associated with a first chip, to serial link 176 which is associated with a second chip. Upon receipt of the transmitted data by serial link 176, a CRC is computed through module 178 and checked against the CRC from CRC module 172. If there is an error associated with the CRC from CRC module 178, a bit is flipped, i.e., the data is intentionally corrupted in order to ultimately retransmit the data as will be explained below. Simultaneously with the CRC calculation, deserializer FIFO buffer 184 deserializes the data from serial link 113. A parity check is performed for the data leaving deserializer FIFO 184 through parity check 180.

Continuing with FIG. 5, the parity check is carried through to module 182 and in the case of an error, a retry signal 136 is communicated back to the appropriate retry pointer. In one embodiment, the retry pointers are determined by control logic. When scheduling out of main memory, it should be appreciated that something new or a retry pointer may be scheduled. In another embodiment, the retry signal goes back to the control logic on the other chip that determines which retry pointer to use and that a retry pointer should be used instead of something new. Thus, a single bit is carried through as a bad value in order to generate the retry signal. In one embodiment, retry pointer 124-1 is an 11-bit pointer specifying where in memory the requested data sits. Scheduler 126, which is shared by all of the retry pointers, is configured to override selection module 140 in order to obtain and re-transmit the appropriate data. In one embodiment, forcing an error flag by carrying through the single bit as a bad value through modules 168, 170, 172, 178, 180 and 182 initiates the retry signal 136. It should be appreciated that the configuration described herein enables two memories that are operating at different speeds to efficiently communicate with each other. However, one memory will retain the transmitted data until it can be determined that the transmitted data has been received successfully, in one embodiment of the invention. Modules 184, 186, 188 and 190 function to deserialize the received data and place the data in the memory of chip 2. It should be appreciated that this functionality may be provided by a double buffer as described with reference to FIG. 4.

Figure 6:
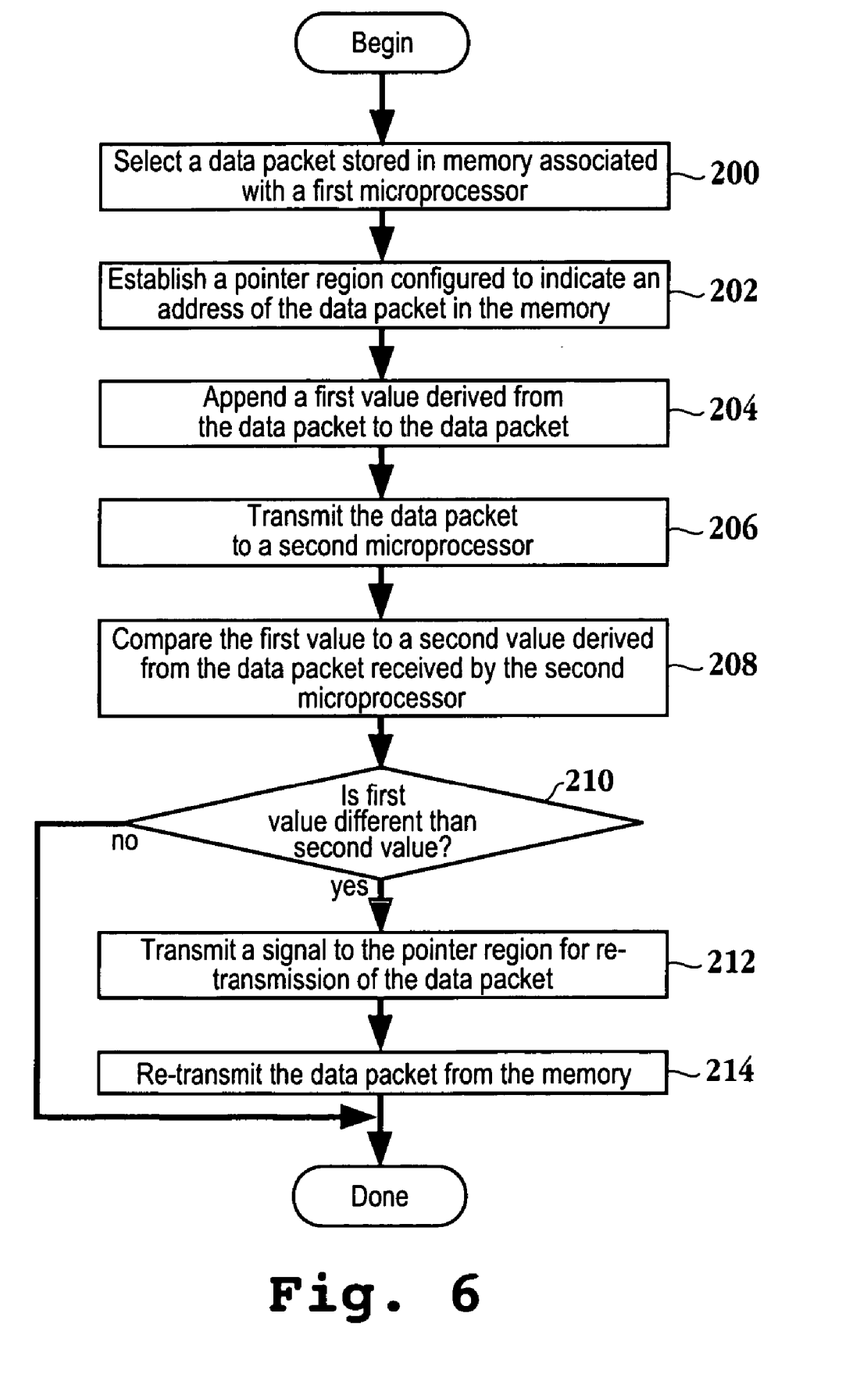
FIG. 6 is a flow chart diagram of a method for reliably transmitting data between microprocessors in accordance with one embodiment of the invention.

FIG. 6 is a flow chart diagram of a method for reliably transmitting data between microprocessors in accordance with one embodiment of the invention. The method initiates with operation 200 where a data packet stored in memory associated with the first microprocessor is selected. As described above, selection logic may perform this function. The method then advances to operation 202 where a pointer region configured to indicate an address of the data packet in the memory is established. In one embodiment, the pointer region includes a plurality of retry pointers configured as described with reference to FIGS. 2 through 5. The method then proceeds to operation 204 where a first value derived from the data packet is appended to the data packet.

Here, the first value may be associated with a cyclic redundancy check (CRC). In addition, parity bits may be appended to the data as described above in order to perform parity checks at different stages of the process. The method then moves to operation 206 where the data packet is transmitted to a second microprocessor. In one embodiment, the data is transmitted through a buffer and a serial link to the second microprocessor. It should be appreciated that the error checking of operation 204 may occur simultaneously with the data being transmitted through a buffer and a serial link. The method then advances to operation 208 where the first value is compared to a second value, where the second value is computed based on the data packet received by the second microprocessor. Here, a CRC calculation is performed.

The method of FIG. 6 then proceeds to decision operation 210 where it is determined if the first value is different from the second value. If the first value is different from the second value in decision operation 210, then the method proceeds to operation 212. In operation 212, a signal to the pointer region is transmitted for re-transmission of the data packet. Here, the signal may be a retry signal sent to a retry pointer associated with the data packet to be re-transmitted, as described above with reference to FIGS. 2 through 5. More particularly, as described with reference to FIG. 5 a scheduler module may override selection logic in order to re-transmit the data packet from memory. The method then moves to operation 214 where the data packet is re-transmitted from the corresponding address in memory. Here, a Go-Back-N protocol may be used to determine if any later transmitted data is also re-transmitted. It should be appreciated that by intentionally corrupting a CRC value and/or flipping a bit of a parity check once an error is detected, and propagating the corrupted data through the system, causes a retry signal to be generated. The retry signal is directed to the appropriate retry pointer associated with the memory address of the data to be retransmitted. Thus, by eliminating the retry buffers and integrating them into the memory and replacing the retry buffers with retry pointers, more memory space becomes available. However, the data is still transmitted reliably between microprocessors and the overhead is minimized, as the decode logic associated with the retry buffers is eliminated. Additionally, if the first value is not different than the second value in decision operation 210, then the method terminates.

In summary, the present invention provides a scheme for protecting the transmission of data between microchips, e.g., within a system on a chip environment or a plurality of interface chips in communication with a switch. The embodiments described above force an error flag upon the detection of an error associated with the transmission operation in order to initiate a retry or re-transmission operation. One skilled in the art will appreciate that a Go-Back-N protocol may be followed when determining which data to retransmit once an error has been detected. Additionally, the retry pointers cut down on the area of the chip occupied and are associated with less overhead. Moreover, by integrating the retry buffers into the memory, the extra capacity gained may be used for any memory operation as opposed to being restricted to retry transmission.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, main frame computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for reliably transmitting data between microprocessors, comprising:
    selecting a data packet stored in memory associated with a first microprocessor to be transmitted from the first microprocessor to a second microprocessor;
    establishing a pointer region configured to indicate an address of the data packet in the memory, the pointer region being separate from the memory;
    appending a first value derived from a data portion of the data packet to the data packet;
    transmitting the data packet to said second microprocessor;
    comparing the first value to a second value derived from the data packet received by the second microprocessor;
    if the second value is different than the first value then the method includes, transmitting a signal to the pointer region for retransmission of the data packet; and
    retransmitting the data packet from the memory;
    wherein the pointer region includes a plurality of retry pointers, each of the plurality of retry pointers being 11 bit pointers.

2. The method of claim 1, wherein the method operation of appending a first value derived from the data packet to the data packet includes,
    calculating a cyclic redundancy check (CRC) to append with the data.

3. The method of claim 1, wherein the method operation of appending a first value derived from the data packet to the data packet includes,
    performing a parity check on the data packet; and
    if the parity check locates an error, then the method includes,
    corrupting a CRC value associated with the data packet.

4. The method of claim 3, wherein the method operation of transmitting a signal to the pointer region for re-transmission of the data packet includes,
    communicating a memory address of the data packet to a scheduling module; and
    directing selection logic to select the data packet for re-transmission.

5. The method of claim 1, wherein the method operation of establishing a pointer region configured to indicate an address of the data packet in the memory includes,
    defining a plurality of retry pointers within the pointer region; and
    associating one of the plurality of retry pointers with a memory address of the data packet.

6. A microchip configured to reliably transmit data comprising:
    a memory region for storing data;
    a selection module configured to select a portion of the data from the memory region for transmission;
    an error-checking module configured to calculate a value derived from the selected portion of the data prior to transmission of the selected portion;
    a pointer region including a plurality of object pointers, one of the plurality of object pointers associated with an address of the portion of the data, wherein the one of the plurality of object pointers is configured to receive a signal indicating an error associated with the transmission of the selected portion of the data, the pointer region being separate from the memory;
    a scheduler module in communication with each of the plurality of object pointers, wherein the scheduler module is configured to schedule retransmission of the selected portion of the data from the memory in response to the signal indicating the error being received by the one of the plurality of object pointers;
    wherein the signal is a retry signal and the one of the object pointers is an 11-bit retry pointer.

7. The microchip of claim 6, wherein the error checking module is configured to cause the signal to be generated by an external error checking module when an error associated with data is detected, the external error checking module being external to the error checking module.

8. The microchip of claim 6, further comprising:
    a single buffer configured to receive the selected portion of the data; and
    a serializer buffer capable of serializing data for transmission.

9. The microchip of claim 6, wherein each the plurality of object pointers is an 11 bit retry pointer.

10. The microchip of claim 6, wherein the scheduler module is configured to override the selection module to schedule re-transmission of the selected portion of the data from the memory.

11. The microchip of claim 6, wherein the error checking module is configured to perform both a cyclic redundancy check and a parity check on the selected portion of the data from the memory.

12. A system providing reliable link data flow between microchips, comprising:
    a first microchip including a memory capable of storing a data packet, the first microchip further including,
    a pointer associated with a memory address of the data packet, the pointer being associated with a pointer region separate from the memory;

wherein the pointer is an 11-bit pointer;
a selection logic module in communication with the memory, the selection logic module configured to select the data packet for transmission from the memory; and
an error-checking module configured to calculate a first value derived from the data packet prior to transmission of the data packet from the first microchip;
a serial link; and
a second microchip in communication with the first microchip through the serial link, the second microchip including an error verifying module configured to calculate a second value derived from the data packet received from the first microchip, the error verifying module further configured to compare the second value to the first value, wherein if the first value and the second value are different the error verifying module transmits a signal to the pointer region causing the data packet to be retransmitted to the second microchip from the memory of the first microchip.

13. The system of claim 12, wherein the first microchip further comprises:
a scheduling module in communication with the pointer, the scheduling module configured to override the selection module for re-transmission of the data packet.

14. The system of claim 12, wherein the first microchip further comprises:
a buffer configured to hold the data packet; and
a serial buffer in communication with the buffer, the serial buffer configured to serialize data for transmission.

15. The system of claim 12, wherein the error checking module is configured to perform both a cyclic redundancy check (CRC) and a parity check on the data packet.

16. The system of claim 15, wherein the error checking module is further configured to corrupt the CRC when the parity check detects an error associated with the data packet.

* * * * *